US006853707B2

(12) United States Patent
Kerschner (10) Patent No.: US 6,853,707 B2
(45) Date of Patent: Feb. 8, 2005

(54) SHIELDED X-RAY DETECTOR

(75) Inventor: Ronald K Kerschner, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 102 days.

(21) Appl. No.: 10/235,385

(22) Filed: Sep. 5, 2002

(65) Prior Publication Data

US 2004/0047448 A1 Mar. 11, 2004

(51) Int. Cl.[7] .............................................. G01T 1/24
(52) U.S. Cl. ................... 378/98.8; 378/62; 250/370.09
(58) Field of Search .................... 250/368, 370.09, 250/369, 366, 487.1; 378/98.8, 91, 62

(56) References Cited

U.S. PATENT DOCUMENTS

| 4,694,177 A | * | 9/1987 | Akai ........................... 250/368 |
| 4,910,405 A | * | 3/1990 | Suzuki et al. ................ 250/368 |
| 4,946,238 A | * | 8/1990 | Sashin et al. ................ 385/116 |
| 5,144,141 A | * | 9/1992 | Rougeot et al. ............. 250/369 |
| 5,391,879 A | * | 2/1995 | Tran et al. ................... 250/367 |
| 5,463,224 A | | 10/1995 | Burstein et al. |
| 5,636,299 A | * | 6/1997 | Bueno et al. .................. 385/15 |
| 6,042,267 A | | 3/2000 | Muraki et al. |
| 6,479,827 B1 | * | 11/2002 | Hamamoto et al. ..... 250/370.11 |

* cited by examiner

Primary Examiner—Edward J. Glick
Assistant Examiner—Hoon Song (57) ABSTRACT

An x-ray shielded imaging detector is disclosed. In one embodiment, the x-ray shielded imaging detector comprises a scintillator, a photodetector, and an optical connection between the scintillator and the photodetector. The x-ray shielded imaging detector also includes a first high density shielding material adjacent the optical connection. The first high density shielding material absorbs x-ray energy and attenuates it before the x-ray energy reaches the photodetector when the x-ray energy impinges on the x-ray shielded imaging detector at an angle other than perpendicular to a major axis of the scintillator and the photodetector. Other embodiments and related methods of operating an x-ray system are also disclosed.

9 Claims, 10 Drawing Sheets

SHIELDED X-RAY DETECTOR

BACKGROUND OF THE INVENTION

Many non-destructive testing applications use x-ray radiation to locate objects that are within other structures. For example, x-ray detection is used to image dense objects, such as human bones, that are located within the body. Another application of x-ray detection and imaging is in the field of non-destructive electronic device testing. For example, x-ray imaging is used to determine the quality of solder that is used to connect electronic devices and modules to printed circuit boards.

X-ray imaging works by passing electromagnetic energy at wavelengths of approximately 0.1 to $100 \times 10^{-10}$ meters (m) through the target that is to be imaged. The x-rays are received by a receiver element, known as an x-ray detector, on which a shadow mask that corresponds to the objects within the target is impressed. Dark shadows correspond to dense regions in the target and light shadows correspond to less dense regions in the target.

The dark portions of the shadow mask generally correspond to the objects in the target that are denser than surrounding areas within the target. In this manner, dense objects, such as solder, which contains heavy metals such as lead, can be visually distinguished from less dense regions. This allows the solder joints to be inspected easily.

One way of using x-rays to develop an image of an object is to convert the x-ray light energy into light energy having a longer wavelength than x-rays. The longer wavelength light energy is then applied to a light capturing device, which converts the light into an electrical signal. One such device for converting x-rays into longer wavelength light energy is called a scintillator. A scintillator includes, for example, a cesium iodide strip placed on a substrate of aluminum or carbon. The x-rays impact the cesium iodide, which releases photons at a wavelength of approximately 560 nanometers (nm). The light capturing device also includes an optical path for conducting the photons emitted from the cesium iodide to a light sensitive device. The optical path can be, for example, air, and the light sensitive device can be, for example, an array of charge-coupled device (CCD) elements. The CCD elements convert the photons into an electrical signal that is directed to a signal processing device so that the electrical signals can be transformed into a usable image that depicts the dense regions in the target.

Prior methods used to couple the light from the scintillator to the CCD elements include using conventional reduction optics and focusing the image produced by the scintillator onto the CCD using conventional lenses.

Existing x-ray inspection systems require that the target be placed between the scintillator and the x-ray, and require that the scintillator be movably mounted. The source scintillator is continuously rotated and the x-ray source is steered in a direction opposite the rotation direction of the scintillator so that, at a particular height, referred to as a "z-height," the target will be in focus. One of the drawbacks of such a system is the high cost associated with mechanically mounting and rotating the scintillator. Another drawback is that only one plane is in focus at any time. This requires that the topology of the target (i.e., a printed circuit board (PCB) including components mounted thereon) be known prior to performing the x-ray inspection. Unfortunately, topology mapping is costly, difficult and time consuming.

One manner of addressing some of these drawbacks is to use a number of discrete x-ray detectors arranged, for example, in a circular pattern. Such an arrangement allows a number of images to be captured and synthesized so that an x-ray slice can be created for more than one z-height.

One of the drawbacks encountered when converting x-rays to an electrical signal is that not all of the x-rays that impinge on the cesium iodide scintillator are converted to photons. Some of the x-rays pass through the scintillator and tend to impinge on the CCD array to a degree such that the x-rays degrade the CCD elements over time. Further, the x-rays tend to create noise in the CCD elements, thereby degrading the quality of the electrical signal supplied by the CCD array.

One manner to address this is to provide a material between the, scintillator and the CCD array that can couple the photons to the CCD array, while at the same time attenuating the x-rays before they reach the CCD array. One possible solution is to use a dense glass material to couple the photons to the CCD array. Unfortunately, existing glass materials that could attenuate the x-rays would be overly thick and would tend to degrade (i.e., become yellow) when exposed to x-rays over an extended period of time.

Therefore, there is a need in the industry for a simple and efficient x-ray detector and x-ray system that will not degrade over repeated exposure to x-rays.

SUMMARY OF THE INVENTION

Embodiments of the invention include a shielded x-ray detector. In one embodiment, the invention is an x-ray shielded imaging detector, comprising a scintillator, a photodetector, an optical connection between the scintillator and the photodetector, and a first high density shielding material adjacent the optical connection.

Alternative embodiments and related methods of operation are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

Embodiments of the present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

While described below with particular reference to an x-ray system and x-ray detector that is used to analyze solder on a printed circuit board (PCB), embodiments of the invention are applicable to any x-ray system.

The x-ray detector is typically implemented as a hardware element. However, as will be described below, the method of processing the information obtained from the x-ray detector and the method for controlling the x-ray system can be implemented in hardware, software, firmware, or a combination thereof. In the preferred embodiment(s), the invention is implemented using a combination of hardware and software or firmware that is stored in a memory and that is executed by a suitable instruction execution system. For example, the output of the x-ray detector, or a plurality of x-ray detectors, is typically supplied to an electronic processing system that formulates a display based on the detected x-ray energy. When a computer system is used to control the x-ray system, the method of the invention can be stored in a memory and executed by a processor associated with the x-ray system, as will be described below.

The hardware portion of the invention can be implemented with any or a combination of the following technologies, which are all well known in the art: a discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc. The software portion of the invention can be stored in one or more memory elements and executed by a suitable general purpose or application specific processor.

The program for operating the x-ray system, which comprises an ordered listing of executable instructions for implementing logical functions, can be embodied in any computer-readable medium for use by or in connection with an instruction-execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable-programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1A:
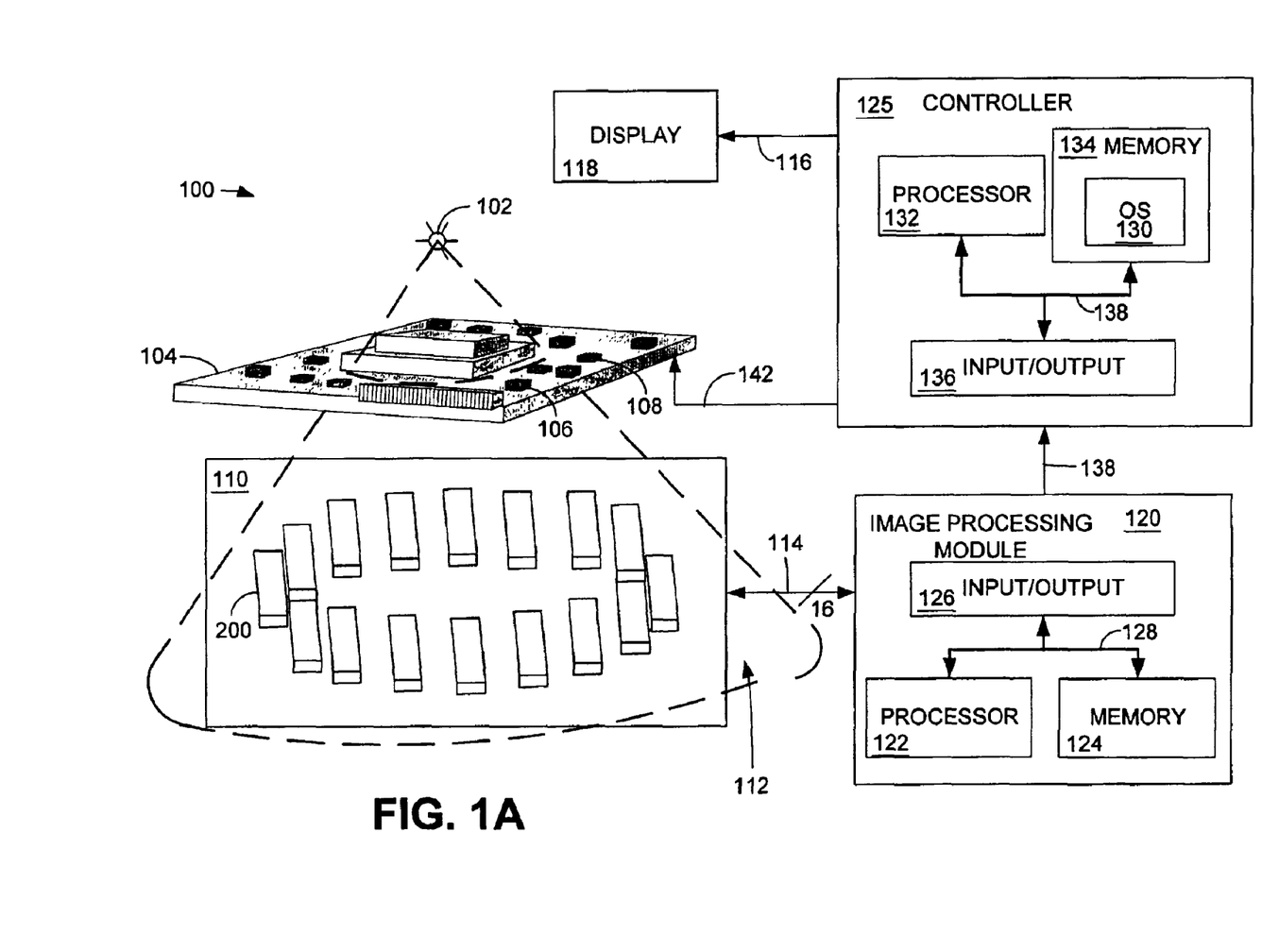
FIG. 1A is a schematic diagram illustrating an exemplary x-ray system in which an x-ray detector constructed in accordance with an aspect of the invention resides.

FIG. 1A is a schematic diagram illustrating an exemplary x-ray system 100 in which the x-ray detector 200 resides. It should be mentioned that the x-ray system 100 includes only the portions of an x-ray system 100 relevant to describing the embodiments of the invention. The x-ray system 100 includes an x-ray source 102 and a plurality of x-ray detector assemblies, an exemplary one of which is illustrated using reference numeral 200. A plurality of x-ray detectors 200 are typically supported on an x-ray detector assembly fixture (hereafter detector fixture) 10. The x-ray detectors 200 are arranged on the detector fixture 110 in a pattern that approximates a circle However, other patterns are possible.

The x-ray detectors 200 and the detector fixture 110 are coupled to an image processing module 120 via connection 114. The image processing module 120 is coupled to a controller 125 via connection 138. The image processing module 120 generally includes a processor 122, one or more memory elements 124, and an input/output (I/O) element 126 coupled via a local interface 128. The x-ray system 100 may include an image processing module 120 for each x-ray detector 200. Each image processing module 120 may receive input from one or more x-ray detectors, depending on the desired processing architecture.

Alternatively, a single image processing module may include sufficient resources to process information from all of the x-ray detectors 200. In other words, the signals from each of the x-ray detectors may be multiplexed and processed in parallel by the image processing module 120.

The controller 125 is coupled to the image processing module 120 via connection 138 and typically comprises a microprocessor that controls the functions of the x-ray system 100. The controller 125 generally includes a processor 132, one or more memory elements 134, and an input/output (I/O) element 136 coupled via a local interface 138.

For example, the controller 125 controls the emission from the x-ray source 102 and controls the movement of the PCB 104 in the x and y directions. In the x-direction the image pixel pitch is determined by the line rate clocking of the light sensing element and the x-ray magnification. In the y-direction the image pixel pitch is determined by the pitch of the pixels on the light sensing element (to be described below) and the x-ray magnification. The PCB 104 is moved in the scan direction (x) such that the motion of the board is coordinated with the clocking frequency of each x-ray detector 200. The controller 125 also receives input from each of the x-ray detectors 200 via the image processing module 120.

The controller 125 is highly simplified and is intended to show only the basic components of an x-ray controller that may be used to control the operations of the x-ray system 100 and process the signals received from each x-ray detector 200 Generally, in terms of hardware architecture, the controller 125 includes processor 132, a memory 134, and an input/output (I/O) element 136 coupled over a local interface 138. The local interface 138 can be, for example, but not limited to, one or more buses or other wired or wireless connections, as known to those having ordinary skill in the art. The local interface 138 may have additional elements, which are omitted for simplicity, such as buffers (caches), drivers, and controllers, to enable communications. Further, the local interface 138 includes address, control, and data connections to enable appropriate communications among the aforementioned components.

The I/O element 136 can include circuitry for receiving the outputs of the x-ray detectors 200 via the image processing module 120 over connection 138, can include circuitry for providing inputs to the x-ray system 100, and can also include a user interface. The user interface can be, for example, a keyboard, a mouse, a stylus or any other device for inputting information into the controller 125.

The controller 125 is coupled to a display 118 via connection 116. The display 118 receives the output of the controller 125 and displays the results of the x-ray analysis The processor 132 is a hardware device for executing software that can be stored in the memory 134. The processor 132 can be any suitable processor for implementing the functionality of the controller 125. The memory 134 can include one or a combination of volatile memory elements (e.g., random access memory (RAM), such as DRAM, SRAM, etc.)), and non-volatile memory elements (e.g., RAM, ROM, hard drive, tape, CD-ROM, etc.). Moreover, the memory 134 may incorporate electronic, magnetic, optical and/or other types of storage media. Note that the memory 134 can have a distributed architecture, where various components are situated remote from one another, but can be accessed by the processor 132.

The software in memory 134 may include one or more separate programs, each of which comprise one or more code segments, which are an ordered listing of executable instructions for implementing logical functions. In the example of FIG. 1A, the software in the memory 134 includes an operating system (O/S) 130 for controlling the functionality of the x-ray system 100. The operating system 130 essentially controls the execution of other computer programs, and provides scheduling, input/output control, file and data management, memory management and communication control and related services. The processor 132 and operating system 130 define a computer platform, for which application programs are written in higher level programming languages.

When the x-ray system 100 is in operation, the processor 132 is configured to execute software stored within the memory 134, to communicate data to and from the memory 134 and to generally control operations of the x-ray system 100 pursuant to the software.

In operation, the x-ray system 100 can be used, for example, to analyze the quality of solder joints formed when components are soldered to a printed circuit board (PCB). For example, a PCB 104 includes a plurality of components, exemplary ones of which are illustrated using reference numerals 106 and 108. The components 106 and 108 are generally coupled to the PCB 104 via solder joints. The x-ray system 100 can be used to inspect and determine the quality of the solder joints. Although omitted for simplicity, the PCB 104 is generally mounted on a movable fixture that is controlled by the controller 125 to position the PCB 104 as desired for x-ray analysis.

The x-ray source 102 produces x-rays generally in the form of an x-ray radiation pattern 112. The x-ray radiation pattern 112 passes through portions of the PCB 104 and impinges on an array of x-ray detectors 200. As the x-rays pass through the PCB 104, areas of high density (such as solder) appear as dark shadows on the x-ray detectors 200, while areas of less density (such as the material from which the PCB is fabricated), appear as lighter shadows. This forms a shadow mask on each x-ray detector 200 corresponding to the density of the structure through which the x-rays have passed. Although omitted for simplicity the x-ray source is also controlled by the controller 125.

As will be described in further detail below, each x-ray detector 200 is constructed and located within the x-ray system 100 so as to receive the x-ray energy from the x-ray source 102 after it passes through the PCB 104. The x-ray detector 200 converts the x-ray energy to a digitized electrical image signal that is representative of the shadow mask that falls on the x-ray detector 200. The digitized electrical image signals from all of the x-ray detectors 200 are sent to the controller 125. The processor assembles the signals into, for example, a single z-height slice, which can then be provided as an output to the display 118.

Figure 1B:
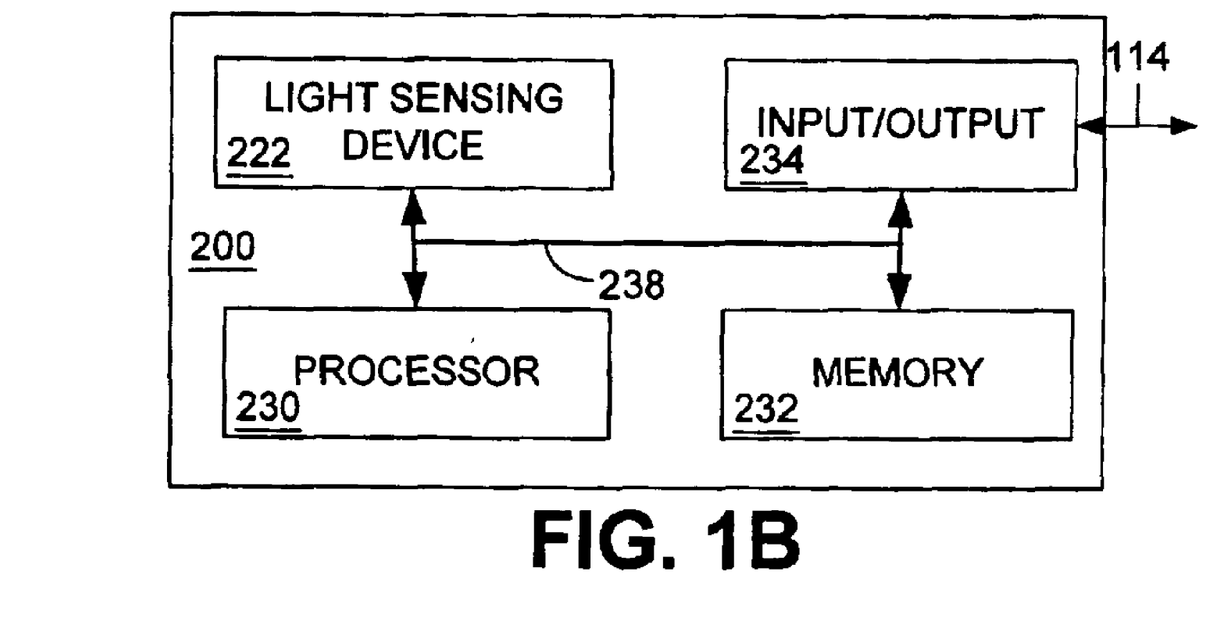
FIG. 1B is a block diagram illustrating the processing components of the x-ray detector of FIG. 1A.

FIG. 1B is a block diagram illustrating the processing components of the x-ray detector 200 of FIG. 1A. The x-ray detector 200, the structure of which will described in greater detail in FIG. 3A, includes a light sensing element 222, a processor 230 and a memory 232 in communication over a local interface 238. The processor 230 and the memory 232 can be similar to the processor 122 and memory 124 described above, but specifically tailored to the task of processing the data generated by the light sensing device 222. The light sensing device 222 can be, for example, an array of CCD elements that convert visible light to an electrical signal. The x-ray detector 200 also includes an input/output (I/O) element 234 in connected to local interface 238. The processor 230 converts the signal received from the light sensing device 222 into a digital signal that represents the light impinging on the light sensing device 222. The output of the processor 230 is sent to the I/O element 234 for transmission over connection 114 to the image processing module 120.

The processor 230 and memory 232 in each x-ray detector 200 may perform image correction operations, such as "flat fielding," as known to those having ordinary skill in the art. The memory 230 is used to store the image data. The images of the PCB 104 are typically acquired in parallel stripes. For example, these stripes can be referred to as stripes 1, 2 . . . n. In three dimensional (3D) x-ray imaging (a slice at a single z-height) the images from all of the x-ray detectors 200 (in this example, 16 images) for stripe 1 are sent from the memory 232 in the x-ray detector 200 to an image processing module 120. The images from stripe 2 will be sent to another image processing module 120, etc.

Figure 2A:
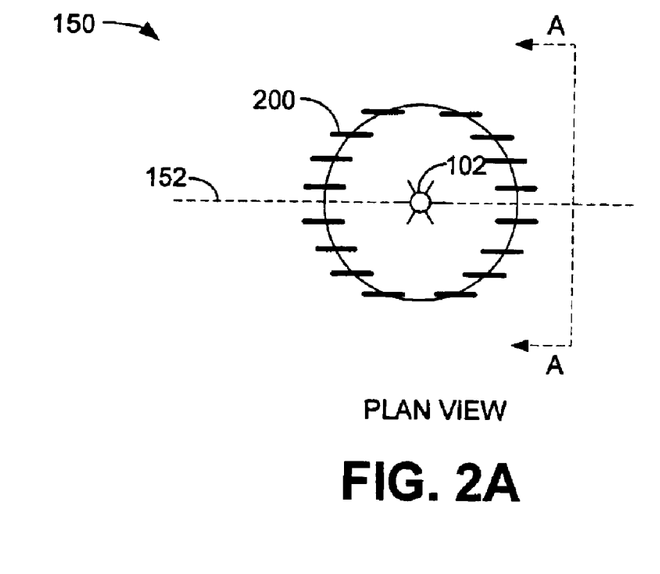
FIG. 2A is a plan view of the x-ray source and the x-ray detectors of FIG. 1A.

FIG. 2A is a plan view 150 of the x-ray source 102 and the x-ray detectors 200 of FIG. 1A. The x-ray source 102 is located generally within the center of a circular pattern defined by the array of x-ray detectors 200. For example, in the embodiment shown in FIG. 2A, when viewed from above the x-ray source 102, 16 x-ray detectors 200 form a generally circular pattern around the x-ray source 102. However, as indicated using the axis 152, x-ray detectors 200 are not located on the axis 152. This is so because, in such a location, x-ray energy from the x-ray source 102 would tend to impinge on the x-ray detector 200 located on the axis 152 in such a way that the x-ray energy would tend to degrade the performance of the x-ray detector. This will be described below.

Figure 2B:
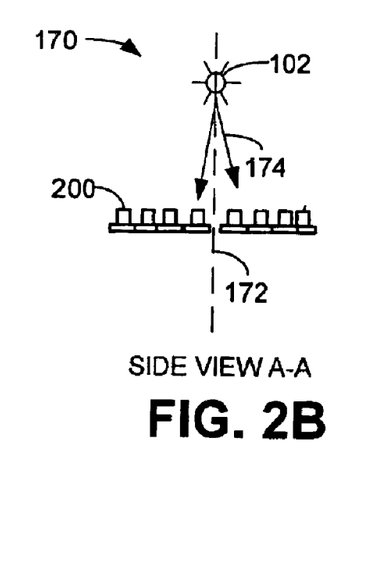
FIG. 2B is a side view illustrating the x-ray system of FIG. 2A taken through section A—A shown in FIG. 2A.

FIG. 2B is a side view 170 illustrating the x-ray system 150 of FIG. 2A taken through section A-A shown in FIG. 2A. The x-ray system 170 of FIG. 2B includes the x-ray source 102 and a plurality of x-ray detectors 200. The vertical axis 172 represents the axis perpendicular to a major axis of the x-ray detector 200.

Generally, it is desirable to prevent x-rays from impinging on the x-ray detector 200 along the axis 172. This is so because when an x-ray detector 200 is located on the axis 172, the x-rays, indicated using reference numeral 174, impinge perpendicularly through the x-ray detector 200 and tend to impinge directly on the photodetector (to be described below) located in the x-ray detector 200. As mentioned above, this direct exposure eventually causes the photodetector located in the x-ray detector 200 to degrade and malfunction over extended x-ray exposure. To prevent this, and as will be described below, the x-ray detector 200 is offset from the axis 172 so that x-rays 174 impinge on the x-ray detector 200 at an angle offset from perpendicular.

Figure 3A:
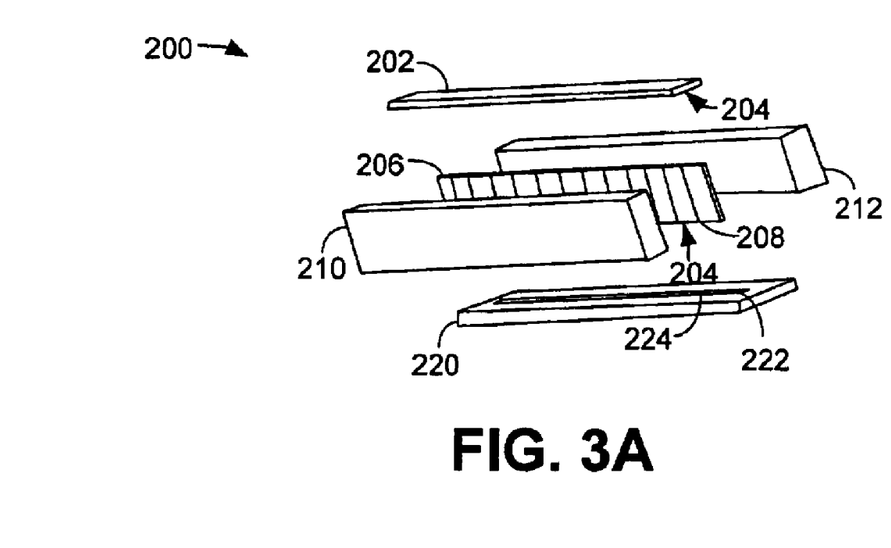
FIG. 3A is an exploded view of an embodiment of the x-ray detector of FIG. 1A.

FIG. 3A is an exploded view of an embodiment of the x-ray detector 200 of FIG. 1A. The x-ray detector 200 comprises a scintillator 202, a fiber array 206, and a PCB 220 on which a light sensing device 222 is located. In this embodiment, the light sensing device 200 is a photodetector array. A portion of the scintillator 202 includes a strip of cesium iodide (CsI) (to be described below with respect to FIG. 4). While other materials can be used for the scintillator 202, cesium iodide provides a superior decay time. Other scintillator materials include, for example, gadolinium oxysulfide, sold under the tradename LANEX, by the Kodak corporation of Rochester, N.Y., and sodium iodide (NaI). NaI is very hydroscopic, and is less desirable than, for example, CsI.

The x-ray energy impinges on the scintillator 202, which is a phosphor, causing the scintillator 202 to transform x-rays into visible light at a wavelength of approximately 560 nm. Essentially, the scintillator 202 converts a substantial portion of the x-ray energy that impinges on it to visible light at a wavelength of approximately 560 nm. However, as will be described below, a portion of the x-ray energy passes through the scintillator 202 and remains at x-ray wavelength. The design of the x-ray detector 200 attenuates this x-ray energy as will be described in detail below.

The scintillator 202 is coupled to the fiber array 206 using an optical refractive index matching medium 204. Two examples of an optical refractive index matching medium are greases and adhesives. Similarly, an optical refractive index matching medium 204 is applied between the fiber array 206 and the photodetector array 222 on the PCB 220. The photodetector array 222 is preferably an array of charge coupled device (CCD) elements that define a plurality of pixels, an exemplary one of which is illustrated using reference numeral 224.

The fiber array 206 includes a plurality of individual optical fibers, an exemplary one of which is indicated using reference numeral 208, each approximately 6 microns ($\mu$m) in diameter. Each pixel 224 on the photodetector array 222 is approximately 2000 $\mu$m$^2$ and arranged at a pitch of 86 $\mu$m. However, other pixel dimensions are possible. The optical fibers can be arranged in a hexagon-like shape. A fiber diameter of 6 $\mu$m, a pixel pitch of 86 $\mu$m and a pixel area of 2000 $\mu$m$^2$ results in approximately 71 optical fibers per pixel.

The fiber array 206 is designed with a very high aspect ratio. The aspect ratio is the ratio of the length of each optical fiber with respect to its diameter. In one embodiment, the aspect ratio of the fiber array is 20:1. However, depending on the arrangement of the fiber array 206 and the pixels 224, other aspect ratios are possible.

In accordance with an aspect of the invention, two portions 210 and 212 of a first attenuation material are sandwiched around the fiber array 206. The first attenuation material can be fabricated using any high density material that attenuates and absorbs x-ray energy. For example, the first attenuation material can be lead, tungsten, gold, or preferably, a material known in the industry as ECOMASS®, a registered trademark of Ecomass® Technologies, of Austin, Tex., USA. Ecomass® is a polymer having tungsten fill.

Figure 3B:
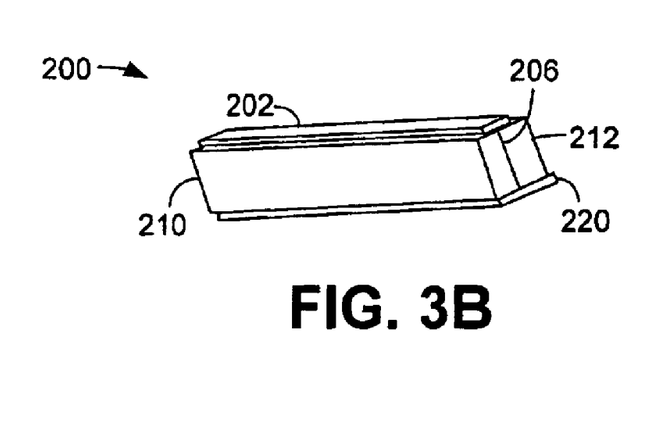
FIG. 3B is a schematic view illustrating an assembled x-ray detector of FIG. 3A.

FIG. 3B is a schematic view illustrating an assembled x-ray detector 200 of FIG. 3A. The portions 210 and 212 of the first attenuation material tightly sandwich the fiber array 206 and are bonded to the PCB 220. The scintillator 202 is bonded to the fiber array 206 and to the portions 210 and 212 of the first attenuation material to form the x-ray detector 200.

Figure 4:
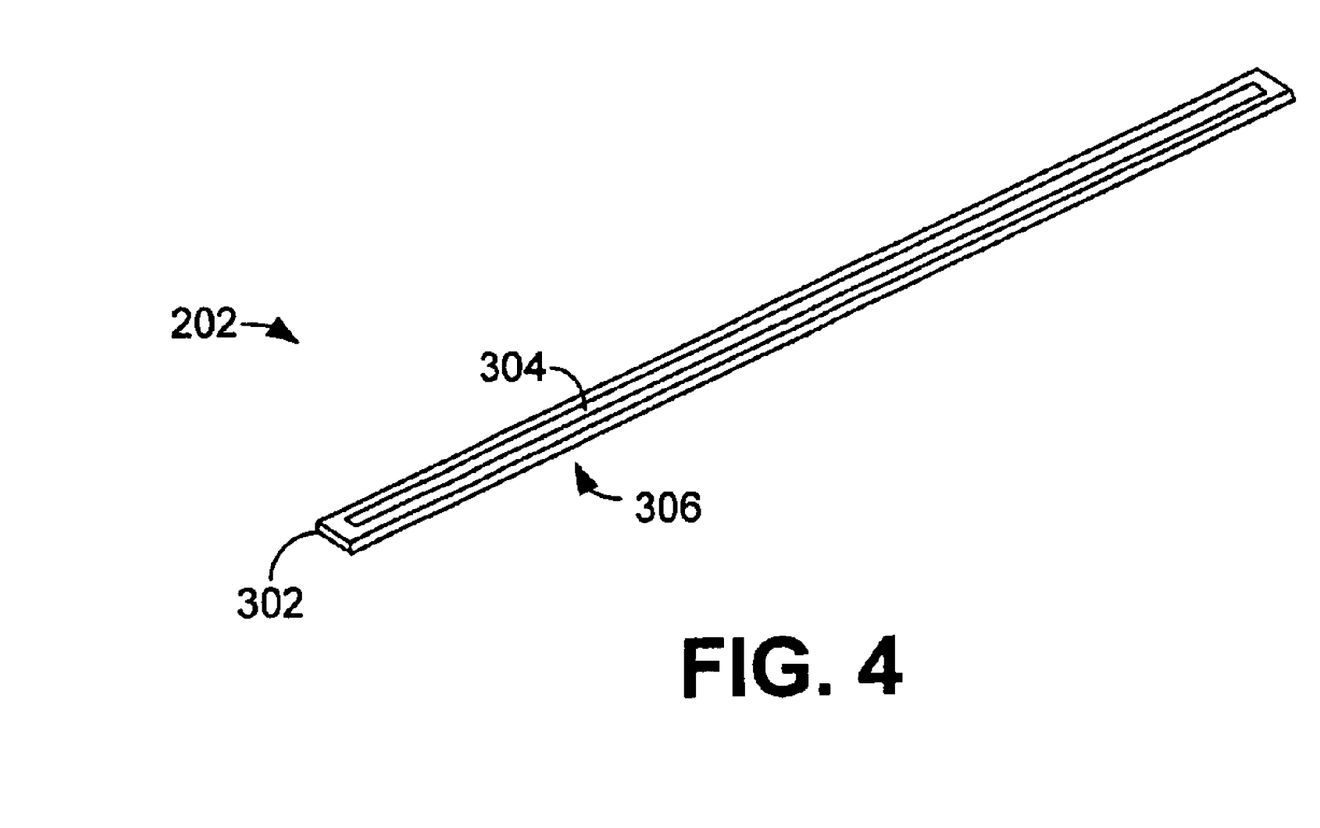
FIG. 4 is a schematic diagram illustrating the scintillator of FIG. 3A.

FIG. 4 is a schematic diagram illustrating the scintillator 202 of FIG. 3A. The scintillator 202 includes a substrate 302, which is preferably aluminum or carbon A strip 304 of cesium iodide is applied over the substrate 302. The surface indicated by reference numeral 306 receives x-ray energy. The x-ray energy is coupled to the cesium iodide strip 304, which transforms the x-ray energy into visible light at a wavelength of approximately 560 nm. The cesium iodide strip 304 is coupled to the fiber array 206 using the optical refractive index matching medium 204 mentioned above with respect to FIG. 3A. In this manner, x-rays are converted to light at a wavelength of approximately 560 nm and supplied from the scintillator 202 through the fiber array 206 to the photodetector array 222 (FIG. 3A). Furthermore, as will be described below, the two portions 210 and 212 of the first attenuation material operate to attenuate any x-rays that pass through the scintillator 202, before they impinge on the photodetector array 222.

Figure 5:
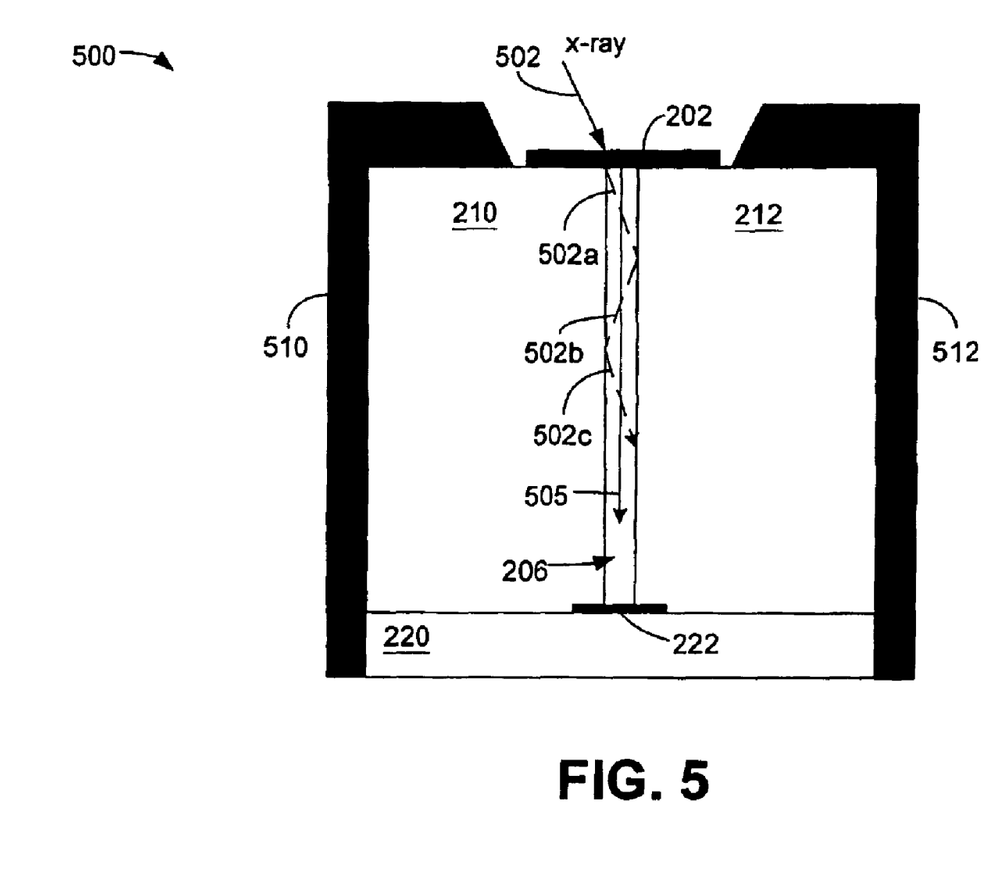
FIG. 5 is a schematic view illustrating a cross-sectional view of an x-ray detector constructed in accordance with an aspect of the invention.

FIG. 5 is a schematic view illustrating a cross-sectional view of an x-ray detector 500 constructed in accordance with an aspect of the invention. As shown in FIG. 5, two portions 510 and 512 of a second attenuation material are applied over the first attenuation material 210 and 212 as shown. The portions 510 and 512 of the second attenuation material can be fabricated from the same material or different materials as the portions 210 and 212 of the first attenuation material. As stated above, the portions 210 and 212 of the first attenuation material and the portions 510 and 512 of the second attenuation material can be fabricated from any highly dense material that can absorb and attenuate x-ray energy.

In FIG. 5, an exemplary x-ray is illustrated using reference numeral 502. The x-ray 502 impinges on the scintillator 202 as shown. The scintillator 202 converts a large portion of the x-ray energy into photons at a wavelength of approximately 560 nm. However, some x-ray energy passes through the scintillator 202. This x-ray energy is indicated in FIG. 5 using reference numerals 502a, 502b and 502c. In accordance with an aspect of the invention, the x-ray 502 impinges on the scintillator 202 at an angle other than perpendicular to the major axis of the PCB 220 and photodetector 222. In this manner, the x-ray energy that passes through the scintillator 202 is conducted through the fiber array 206 at an angle such that the x-ray energy bounces off the portions 210 and 212 of the first attenuation material. This is illustrated using arrows 502a, 502b and 502c, which indicate a steadily decreasing x-ray energy content. In this manner, after one or two bounces between the portions 210 and 212 of the first attenuation material, the x-ray energy is effectively attenuated to zero before it impinges on the photodetector array 222.

The desirable photons that emanate from scintillator 202 are indicated using arrow 505 and impinge directly on the photodetector array 222 so that they can be converted into an electrical signal and forwarded to the controller 125 (FIG. 1A) from the PCB 220.

The portions 510 and 512 of the second attenuation material are applied to the portions 210 and 212 of the first attenuation material such that x-ray energy 502 cannot affect the photodetector array 222 from outside of the x-ray detector 500. Alternatively, the second attenuation material may be a single plate with openings for each x-ray detector shown in FIG. 1A.

Figure 6:
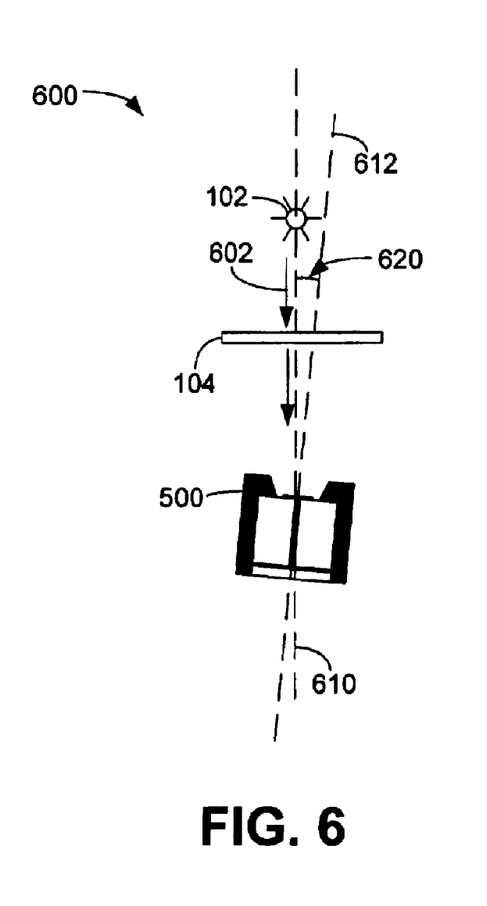
FIG. 6 is a schematic diagram illustrating another manner in which the x-ray detector can be offset from the x-ray source.

FIG. 6 is a schematic diagram 600 illustrating another manner in which the x-ray detector 500 can be offset from the x-ray source 102. As shown in FIG. 6, the vertical axis 610 defined by the x-ray source 102 and the x-ray detector 500 illustrates the axis on which it is undesirable to pass x-ray energy into the x-ray detector 500. Accordingly, the x-ray detector 500 is offset from the axis 610 onto offset axis 612. The offset angle 620 represents the difference between the axis 610 and the offset axis 612. In this manner, x-rays indicated using reference numeral 602 pass through the PCB 104 and are directed onto the x-ray detector 500 as shown in FIG. 5 (i.e., at an angle other than perpendicular to the major surface of the scintillator 202, PCB 220 and photodetector array 222 (FIG. 5)). In this manner, the x-ray energy is directed into the fiber array 206 (FIG. 5) and bounces off the walls of the portions 210 and 212 of the first attenuation material, as described above. Using this methodology, the x-ray energy is prevented from reaching the photodetector array 222.

Figure 7:
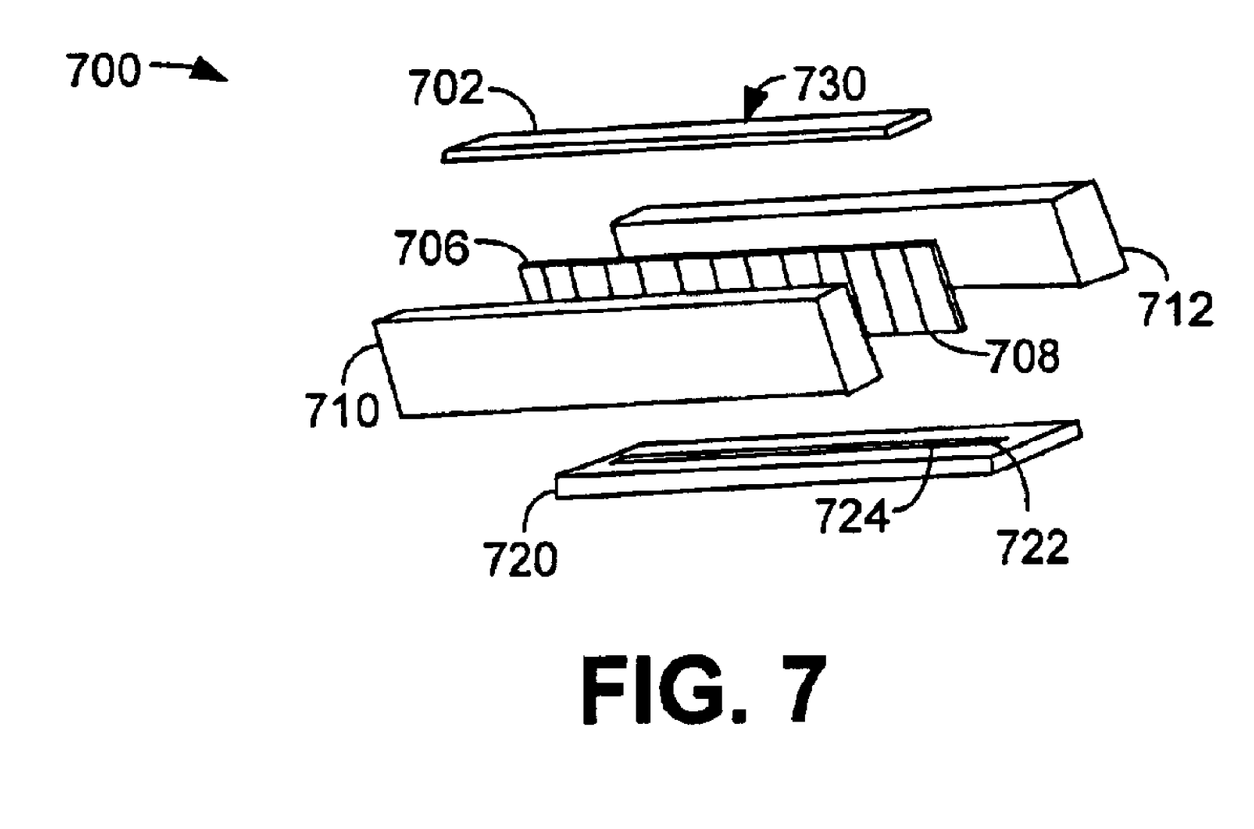
FIG. 7 is an alternative embodiment of the x-ray detector of FIG. 3A.

FIG. 7 is an alternative embodiment 700 of the x-ray detector 300 of FIG. 3A. The x-ray detector 700 includes a direct x-ray conversion element 702. The direct x-ray conversion element 702 converts x-ray energy into an electrical signal. The x-ray detector 700 also includes an array 706 of electrical conductors, an exemplary one of which is illustrated using reference numeral 708. Electrical conductor 708 can be, for example but not limited to, a metallic conductor, or any other structure for conducting an electrical signal from the direct x-ray conversion element 702. The x-ray detector 700 also includes a PCB 720 over which an array 722 of analog-to-digital (A-to-D) converters, an exemplary one of which is illustrated using reference numeral 724, is located.

The x-ray detector 700 includes portions 710 and 712 of a first attenuation material, which is similar to the first attenuation material described above with respect to FIG. 3A. In accordance with this embodiment of the invention, x-ray energy impinging on the surface 730 of the direct x-ray conversion element 702 is converted into an analog electrical signal. The analog electrical signal is conducted via conductors 708 directly to the analog-to-digital converters 724. The analog-to-digital converters 724 convert the electrical signal received from the direct x-ray conversion element 702, via the conductors 708, into a digital signal that is forwarded to the image processing module 120 of FIG. 1A. The portions 710 and 712 of the first attenuation material function as described above to attenuate any x-ray energy that passes the direct x-ray conversion element 702.

Figure 8:
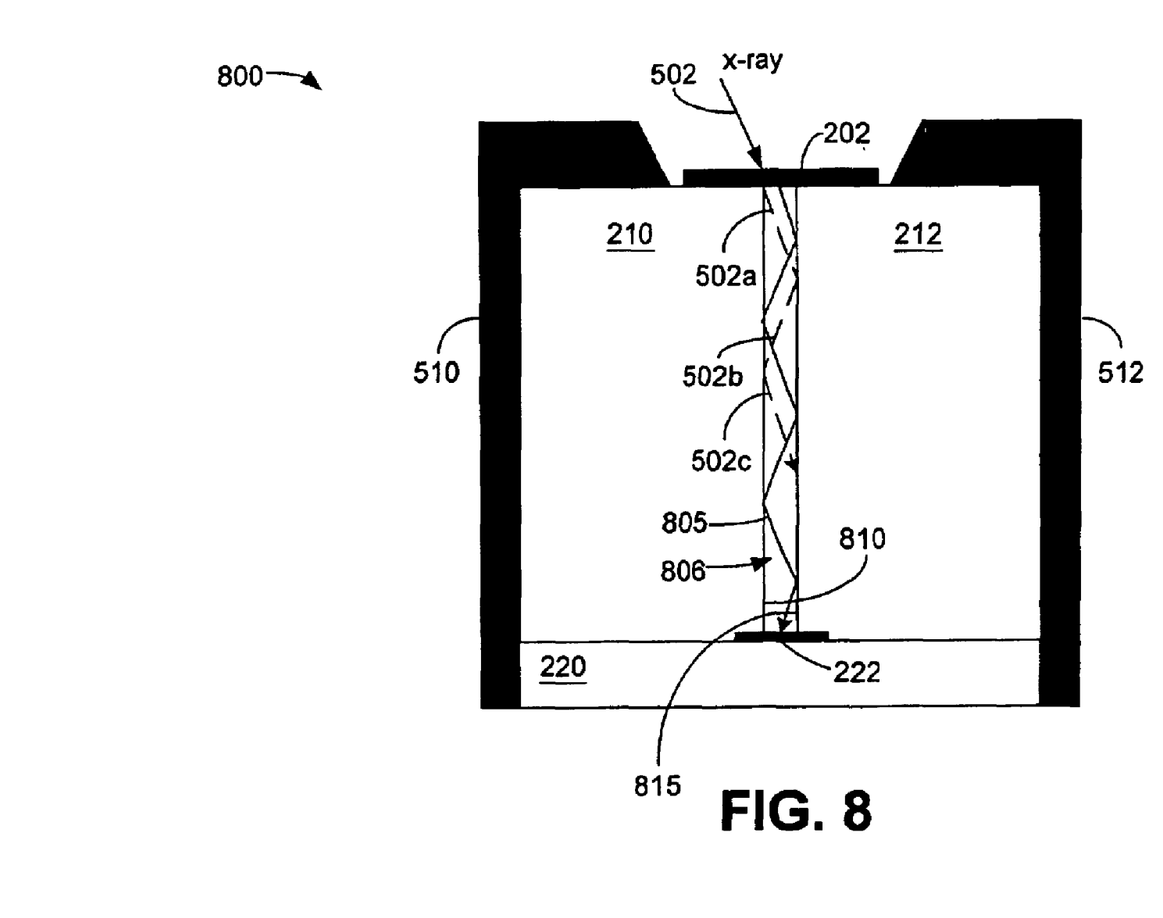
FIG. 8 is an alternative embodiment of the x-ray detector of FIG. 5.

FIG. 8 is an alternative embodiment 800 of the x-ray detector 500 of FIG. 5 The x-ray detector 800 includes a gap 806 instead of the optical fibers described above with respect to FIG. 5. The gap 806 defines one or more discrete optical channels (e.g., an optical waveguide) that transport the visible light indicated using reference numeral 805 from the scintillator 202 to each light sensitive element of the light sensing element 222. Each optical channel may contain, for example, air, an inert gas, or, as will be described with respect to FIG. 9, a liquid.

A reflective coating, such as, for example, gold or aluminum, or a combination thereof, is applied to the surfaces 810 and 815 of the portions 210 and 212 of the first attenuation material that border the gap 806 In this manner, the visible light 805 provided by the scintillator 202 is conducted through the gap 806 by bouncing off the reflective surfaces 810 and 815. However, the x-ray energy that passes through the scintillator 202 (indicated using reference numerals 502a, 502b and 502c) is attenuated as described above with respect to FIG. 5.

Figure 9:
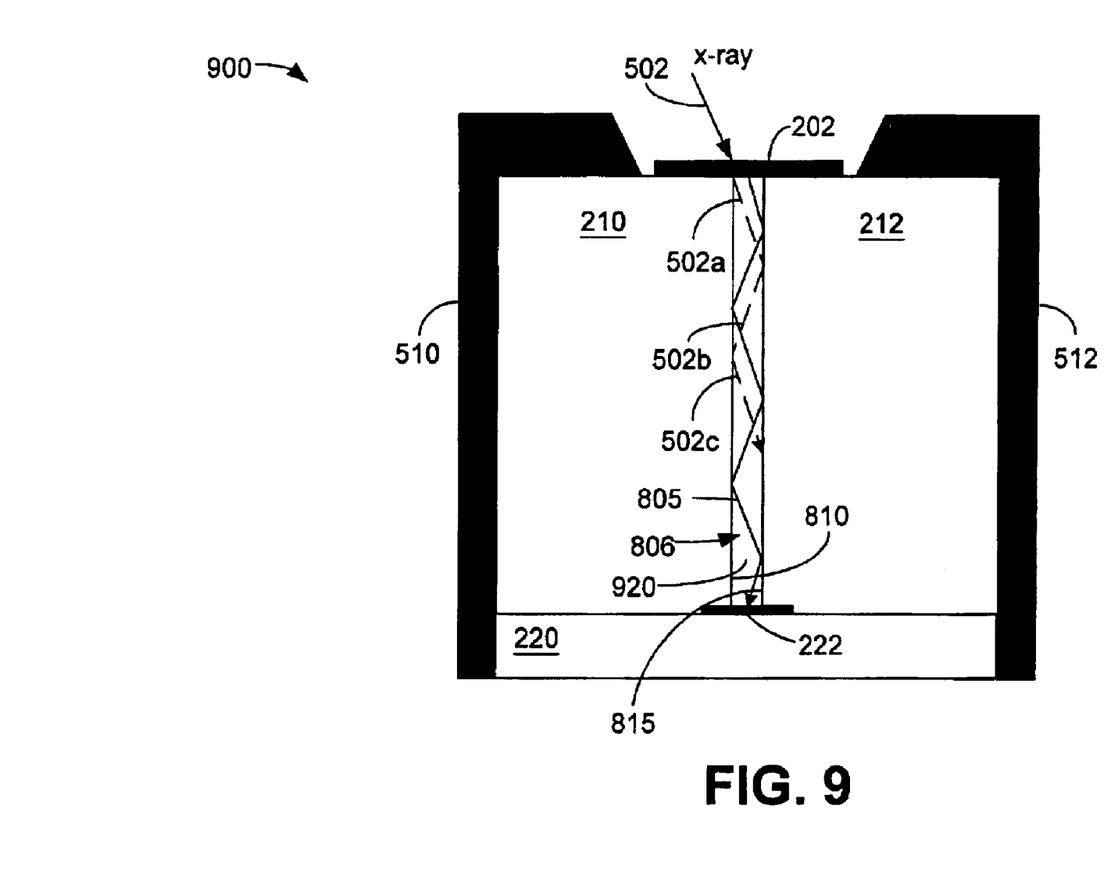
FIG. 9 is an alternative embodiment of the x-ray detector of FIG. 8.

FIG. 9 is an alternative embodiment 900 of the x-ray detector 800 of FIG. 8. In FIG. 9, the gap 806 is filled with an optically conductive fluid 920, through which the visible light indicated using reference numeral 805 travels. In similar fashion to that described above with respect to FIG. 8, the x-ray energy indicated using reference numerals 502a, 502b and 502c is attenuated as described above.

While various embodiments of the invention have been described, it will be apparent to those of ordinary skill in the art that many more embodiments and implementations are possible that are within the scope of this invention. For example the x-ray detector can be fabricated using a number of different attenuation materials. Further, the x-ray detector can be offset from the x-ray source in a variety of ways All such modifications and variations are intended to be included herein within the scope of this disclosure and the present invention and protected by the following claims.

What is claimed is:

1. A method for operating an x-ray imaging system, comprising:

providing an x-ray source;

providing an x-ray detector by:

providing an x-ray to electron converter for converting x-rays into an analog electrical signal;

providing an array of analog-to-digital converters;

providing an electrical conduction path between the x-ray to electron converter and the array of analog-to-digital converters, the electrical conduction path defining a major axis of the x-ray detector;

providing a first high density shielding material adjacent the electrical conduction path; and offsetting the x-ray source from the x-ray detector such that x-ray energy emanating from the x-ray source impinges on the x-ray detector at an angle offset from the major axis of the x-ray detector.

2. The method of claim 1, further comprising forming the electrical conduction path using a plurality of individual electrical conductors, each electrical conductor having a high aspect ratio.

3. The method of claim 2, wherein the aspect ratio of each electrical conductor is approximately 20:1.

4. The method of claim 1, wherein x-rays are attenuated by the first high density shielding material.

5. An x-ray shielded imaging detector, comprising:

means for transforming x-ray energy into an electrical signal;

means for converting the electrical signal into a digital signal;

means for coupling the transforming means to the converting means; and means located adjacent the coupling means for attenuating x-ray energy that passes through the transforming means.

6. The imaging detector of claim 5, wherein the transforming means is a direct x-ray conversion element.

7. The imaging detector of claim 5, wherein the converting means is an array of analog-to-digital converters.

8. The imaging detector of claim 5, wherein the coupling means is an electrical conductor.

9. The imaging detector of claim 5, wherein the means located adjacent the coupling means for attenuating x-ray energy that passes through the transforming means is a high density material suitable for absorbing x-ray energy.

* * * * *